United States Patent [19]

Westermann

[11] Patent Number: 4,656,556
[45] Date of Patent: Apr. 7, 1987

[54] PLASTIC FILM CAPACITOR IN CHIP CONSTRUCTIONAL FORM

[76] Inventor: Wolfgang Westermann, Schellingstr. 7, 6800 Mannheim 1, Fed. Rep. of Germany

[21] Appl. No.: 804,625

[22] Filed: Dec. 5, 1985

[30] Foreign Application Priority Data

Feb. 20, 1985 [DE] Fed. Rep. of Germany ....... 3505888

[51] Int. Cl.⁴ .................... H01G 1/13; H01G 1/14; H01G 7/00
[52] U.S. Cl. .................... 361/307; 361/308; 361/310; 29/25.42
[58] Field of Search ................ 361/301, 303, 306–310, 361/323, 433; 29/25.42

[56] References Cited

U.S. PATENT DOCUMENTS

| | | | |
|---|---|---|---|
| 4,255,779 | 3/1981 | Meal | 361/308 |
| 4,333,213 | 6/1982 | Meal et al. | 29/25.42 |
| 4,417,298 | 11/1983 | Nakata et al. | 361/433 |
| 4,455,591 | 6/1984 | Lavene | 29/25.42 |
| 4,578,737 | 3/1986 | Westermann | 361/308 |

FOREIGN PATENT DOCUMENTS

| | | |
|---|---|---|
| 1614611 | 8/1970 | Fed. Rep. of Germany . |
| 2353154 | 4/1975 | Fed. Rep. of Germany . |
| 2927011 | 2/1980 | Fed. Rep. of Germany . |
| 3125711 | 1/1983 | Fed. Rep. of Germany . |
| 3225782 | 2/1983 | Fed. Rep. of Germany . |
| 3320257 | 8/1984 | Fed. Rep. of Germany . |
| 1097609 | 1/1968 | United Kingdom . |

Primary Examiner—L. T. Hix
Assistant Examiner—Douglas S. Lee
Attorney, Agent, or Firm—Schwartz, Jeffery, Schwaab, Mack, Blumenthal & Evans

[57] ABSTRACT

A plastic-film wound capacitor having a cast resin, cast-coated cup encapsulation and connecting wires which radially make contact with the wound capacitor body can be simply and economically manufactured in chip configuration. The connecting wires of the chip capacitor are bent through 180° and connected, respectively, to a sheet metal section on the outside of the cup encapsulation.

18 Claims, 3 Drawing Figures

PLASTIC FILM CAPACITOR IN CHIP CONSTRUCTIONAL FORM

BACKGROUND OF THE INVENTION

The present invention relates to a plastic-film capacitor, in particular a metallized, wound capacitor with a cast-resin, cast-coated encapsulation and connecting wires which radially make contact with the wound capacitor body.

Wound plastic-film capacitors in chip configuration are known, for example, from German Offenlegungsschrift No. 3,320,257, which are encapsulated in thermosetting plastic compression molding compounds and which exhibit connecting elements of thin sheet metal at their end faces. The disclosed use of encapsulation and sheet metal connecting elements, respectively, serves to protect the sensitive wound capacitor body against stresses that arise during dip soldering, when the entire wound capacitor body comes into direct contact with liquid tin at a temperature of approximately 260° C., during a soldering time of approximately 5 seconds. The thermosetting encapsulation, which remains dimensionally stable at the temperature of soldering, prevents a bulging of the wound capacitor body which results from the trapping of air between the individual wound layers and the shrinking of the stretched plastic films. The connecting elements, comprised of thin sheet metal having a thickness of preferably 0.1 mm or more, form a good heat resistor with respect to the wound capacitor body.

In the case of plastic film capacitors, however, the above-described technique of encapsulating chip-configured capacitors with thermosetting plastic compression molding compounds has a number of short-comings. The encapsulation process must be carried out at high pressures and temperatures between 150° and 180° C.; as a result, for example, in the case of superthin film capacitors of polyester, there may occur a shrinking of the plastic films and heat damage to the dielectric material. In the case of metallized wound capacitors capable of regeneration, the increased layer pressure in the wound capacitor body produced by the encapsulation pressure also brings about an impairment of the regeneration capability and, consequently, the risk of a reduced insulation resistance.

For small components such as chip capacitors, the efficiency of this encapsulation technique is also impaired by the extremely ineffective usage of the encapsulating material. Encapsulation in the end product incorporates less than 10% of the encapsulating material actually used; the remainder of the encapsulating material accumulates as spider-like sprue. But a repetition of the injection molding of the spider-like sprue material is out of the question, since a thermosetting material is involved. Consequently, after the processing over 90% of the expensive plastic compression molding compound accumulates as unavoidable scrap.

The connecting elements of thin sheet metal in known chip capacitors are considerably more expensive compared to the connecting wires in conventional wound capacitors. For purposes of automation, tinned metal strips are stamped out in such a manner that contact can be made with the wound capacitor bodies in a serial manner, as a result of which processing units are produced. To provide the suitable gaps before contact is made, a large proportion of the relatively expensive strip material is already stamped out, and consequently, accumulates as waste. After the encapsulation of the wound capacitor bodies in the processing unit, the connecting bridges must, in addition, be punched out for the purpose of separation. In this way only a tiny fraction of the high quality strip material can be used for its intended function, as a connecting element. The remaining strip material is waste for which, in the optimal situation, a scrap return may be obtained after fairly large amounts have accumulated.

SUMMARY OF THE INVENTION

It is therefore an object of the present invention to provide an encapsulated, wound plastic-film capacitor in chip configuration that can be manufactured more simply and more economically than known chip capacitors.

It is also an object of the present invention to provide a chip capacitor having improved electrical properties which is also dimensionally stable during soldering to mount the chip on a conductor board, and which exhibits good heat resistance at the resulting connections.

It is another object of the present invention to provide a relatively inexpensive process for producing a heat-resistant chip capacitor, which process can be implemented using facilities for making conventional wired capacitors.

In accomplishing the foregoing objects, it has been provided, in accordance with one aspect of the present invention, a capacitor in chip configuration, comprising (i) a capacitor body comprised of synthetic resin film as dielectric; (ii) a coating provided on the capacitor body, the coating comprising a thermosetting material; (iii) two connecting wires which make contact radially with the capacitor body and which project together from the capacitor body through a predetermined surface of the coating; and (iv) an encapsulation body provided around the coating such that the predetermined surface is not contacted by the encapsulation body, wherein the projecting section of each of the connecting wires (A) is bent, over the encapsulation body and (b) contacts a metal plate. In preferred embodiments, each of the connecting wires is bent over the encapsulation body through an angle of about 180° C. and engages a groove in the encapsulation body, respectively.

In accordance with another aspect of the present invention, a process has been provided for manufacturing a capacitor in chip configuration, comprising the steps of (a) providing an encapsulation body which has a cavity that is accessible from the exterior of the encapsulation body; (b) positioning in the cavity a capacitor body comprised of synthetic resin film as dielectric, the capacitor body making radial contact in the cavity with two connecting wires; then (c) pouring a fluid thermosetting material around the capacitor in the cavity such that both of the connecting wires project from the capacitor body through the thermoplastic material; (d) bending each of the connecting wires over the encapsulation body; and (e) contacting a metal plate to each of the connecting wires whereby the metal plates form the electrical contact elements of the capacitor. In one preferred embodiment, the above-described step (a) comprises casting the encapsulation body in cup configuration from a thermoplastic material, preferably poly(phenylene sulfide).

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

Figure 1:
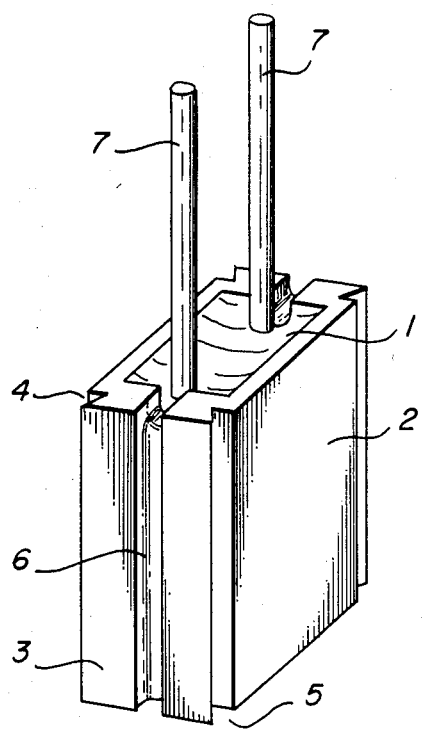
FIG. 1 is a diagram that provides a perspective view of a radially wired, wound plastic-film capacitor having a cup encapsulation, in accordance with the present invention.

The wound plastic-film, chip-configured capacitor of the present invention is similar in its electrical properties and the cheapness of manufacture to conventional wired, wound plastic-film capacitors. The cup encapsulation of a capacitor within the present invention is manufactured by means of the cup casting process normally employed in producing wound plastic-film capacitors. This casting process has been widely used for wound plastic-film capacitors because it can be implemented inexpensively, with low material usage and little waste, and can be automated with high productivity, to yield a high quality encapsulation, e.g., as reflected by the high moisture protection provided.

The art is familiar with modern dispensing systems for casting resin, which systems calculate the required quantities precisely for the number of capacitors to be coated by casting, thereby eliminating accumulation of excess as waste. On the other hand, the manufacture of cup encapsulation is today also virtually free of waste; if thermoplastic materials are used, the spider-like sprue can be comminuted and injection molded again.

A radially wired, wound plastic-film capacitor having the very economical and technically high quality casting-resin, cast-coated cup encapsulation described above is adapted to chip configuration, according to the present invention, in a surprisingly simple manner. More specifically, connecting wires are used that are bent through 180° and connected to a sheet metal section on the outside of the cup encapsulation. With the exception of an additional concluding operational step, the chip capacitor of the present invention can be manufactured in the same way as a wired capacitor. A great advantage provided by such a chip capacitor is the same highly productive facilities used for making the conventional wired capacitors. Additional facilities are required only for the concluding operational step in which, with the connecting of the sheet metal plates, the wired capacitor is converted to a chip capacitor. The use of narrow sheet metal sections as the connecting elements which can be cut to length without waste, allow for a 100% utilization of the expensive starting material in a manner not heretofore possible in known chip capacitors.

In addition to the economic aspects, far reaching technical advantages provided by the present invention over the known embodiments should also be stressed. For example, the casting-resin, cast-coated cup encapsulation encloses the winding of the chip capacitor of the present invention virtually without pressure, and consequently does not impair the regeneration capability and the insulation resistance resulting therefrom. The hardening of the casting resin takes place at temperatures of approximately 100° C. or lower, so that there is no initial thermal damage to the sensitive dielectric material. Dimensional stability, both during and after the soldering process for mounting the chip capacitor on a conductor board, is guaranteed, even with thin cup wall thicknesses, by the appropriate selection of a suitable encapsulating material, such as a polyester or poly(phenylene sulfide) material with a processing temperature of 340° C. to 370° C. Heat resistance is further improved by interposing a thin connecting wire comprised of a metal with poor thermal conductivity, for example, nickel silver. The contacting quality automatically improves during the soldering process by virtue of liquid tin penetrating, as a result of capillary action, between the wire and sheet metal section.

FIG. 1 shows a wound plastic film capacitor of the present invention, with a cast-resin cast-coating 1 and a cup 2, preferably of poly(phenylene sulfide), has dimensions corresponding to the measurements of a chip capacitor. The narrow sides 3 of the cup 2 have a dovetail-like construction, i.e., they carry dovetail-type undercuts at upper edge 4 and at lower edge 5. In each case, the narrow side 3 is divided by a longitudinal groove 6 which is provided in snap-in fashion (i.e., the cross-section of the groove 6 is somewhat smaller than the cross-section of a connecting wire 7) and serves to accommodate connecting wire 7.

Figure 3:
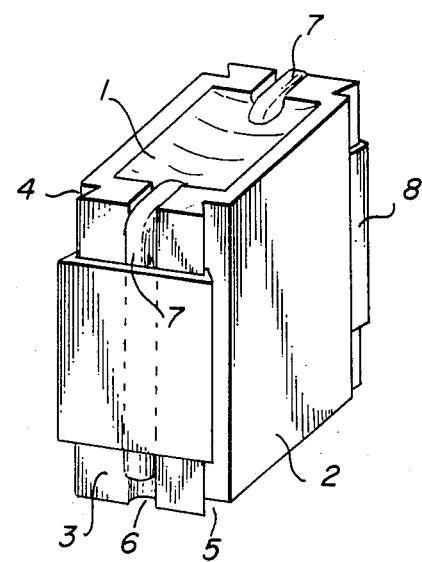
FIG. 3 is a diagram that provides a perspective view of another embodiment of a chip capacitor according to the present invention.
Figure 2:
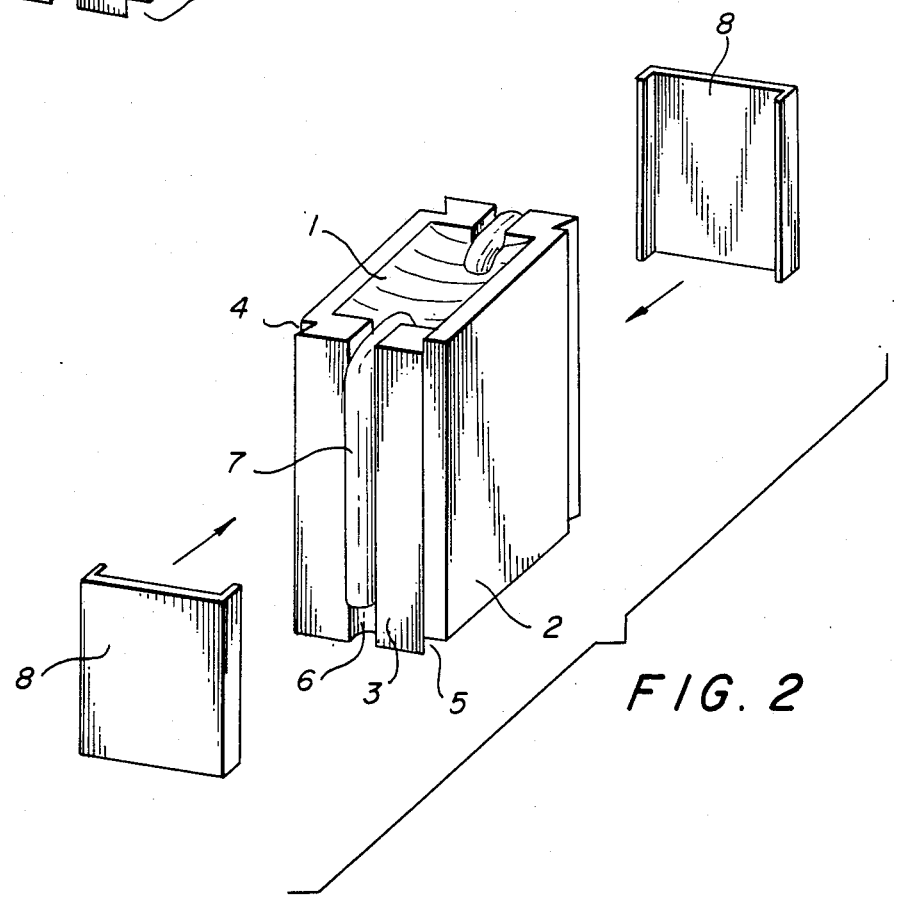
FIG. 2 is a diagram showing a view which corresponds to that of FIG. 1, but with connecting wires bent over and sheet metal sections depicted before connection to the connecting wires.

The chip capacitor of the present invention is manufactured similarly to a wired capacitor, with connecting leads making contact radially with the wound capacitor body. Thus, cast-coating of the special cup 2 and testing, as well as marking, of the capacitor proceed in precisely the same way as for a wired capacitor. Additional operational steps that convert the wired capacitor into a chip capacitor begin thereafter. The two connecting wires 7 are bent through 180° and inserted in the snap-in grooves 6. As is evident from FIG. 2, tinned sheet metal sections 8, which are preferably flat and rectangular, are then fitted to the narrow side 3 of the cup 2 and over the inserted wires 7. Bent-over edge regions of the sheet metal sections 8 engage the dovetail-type undercuts at the upper edge 4 and the lower edge 5 of the narrow side 3 of cup 2, as a result of which the sheet metal sections 8 are secured to the cup 2 and connected to the connecting wires. The sheet metal sections 8 and the wires 7 lying thereunder are in pressure contact with each other because the wires 7 project somewhat beyond the grooves 6. The sheet metal sections 8 and underlying wires 7 are then welded together by a known technique. The finished chip capacitor is represented diagrammatically in FIG. 3.

One technical advantage of the embodiments depicted in the above-referenced drawings lies in the fact that sheet metal section 8 extends from the upper edge 4 to the lower edge 5 of the end-face narrow side 3 of the cup 2. In conventional coated chip capacitors, this is only possible at one edge because of the emergence of the connecting sheet metal plate at the seam. The placement of sheet metal section 8, according to the present invention, renders the chip capacitors shown in the drawings discussed above exceptionally "shading-proof," even when there is a high packing density of chip capacitors on a conductor board. (In this context, "shading" signifies non-wetting of a connecting tag and a soldering eye with soldering tin.) At the same time, the chip capacitor of the present invention is generally amenable to processing with any conventional soldering technique, such as conducting-adhesive, reflow or wave soldering.

Examples of materials for the various elements of the capacitor of this invention are shown in the following:
cup 2: polyester, preferably poly(phenylene sulfide),
cast resin 1: epoxy resin, polyester resins,
wires 7: copper, preferably nickel silver, both preferably tinned,
metal plate 8: copper, brass, steel, nickel, preferably nickel silver, all preferably tinned.

What is claimed is:
1. A capacitor in chip configuration, comprising:
   (i) a capacitor body comprised of synthetic resin film as dielectric;
   (ii) a coating provided on said capacitor body, said coating comprising a thermosetting material;
   (iii) two connecting wires which make contact radially with said capacitor body and which project together from said capacitor body through a predetermined surface of said coating; and
   (iv) an encapsulation body provided around said coating such that said predetermined surface is not contacted by said encapsulation body,
   wherein the projecting section of each of said connecting wires (A) is bent over said encapsulation body and (B) contacts a metal plate.
2. A capacitor according to claim 1, wherein each of said connecting wires is bent over said encapsulation body through an angle of about 180°.
3. A capacitor according to claim 1, wherein each of said connecting wires is bent over said encapsulation body to engage a groove in said encapsulation body.
4. A capacitor according to claim 3, wherein said groove has a cross-section that is smaller than the cross-section of the connecting wire engaged by said groove, so that said wire is received in said groove by a snap-in hold.
5. A capacitor according to claim 1, wherein said encapsulating body provides dovetail-type undercuts to engage said metal plate.
6. A capacitor according to claim 1, wherein said metal plate is comprised of tinned sheet metal.
7. A capacitor according to claim 1, wherein said metal plate is welded to a connecting wire.
8. A capacitor according to claim 1, wherein said encapsulation body has a cup configuration.
9. A capacitor according to claim 1, wherein said encapsulation body is comprised of a thermoplastic material.
10. A capacitor according to claim 9, wherein said thermoplastic material is a poly(phenylene sulfide).
11. A capacitor according to claim 10, wherein said connecting wires comprise a material having low thermal conductivity.
12. A capacitor according to claim 11, wherein said material having low thermal conductivity comprises nickel silver.
13. A process for manufacturing a capacitor in chip configuration, comprising the steps of:
   (a) providing an encapsulation body which has a cavity that is accessible from the exterior of said encapsulation body;
   (b) positioning in said cavity a capacitor body comprised of synthetic resin film as dielectric, said capacitor body making radial contact in said cavity with two connecting wires; then
   (c) pouring a fluid thermosetting material around said capacitor in said cavity such that both of said connecting wires project from said capacitor body through said thermoplastic material; thereafter, bending each of said connecting wires over said encapsulation body; and
   (d) contacting a metal plate to each of said connecting wires whereby said metal plates form the electrical contact elements of said capacitor.
14. A process according to claim 13, wherein step (a) comprises casting said encapsulation body in cup configuration from a thermoplastic material.
15. A process according to claim 13, wherein step (d) comprises bending each of said connecting wires through an angle of about 180° C. over said encapsulation body.
16. A process according to claim 13, wherein step (d) comprises bending each of said connecting wires to engage a groove provided in said encapsulation body.
17. A process according to claim 16, wherein said groove has a cross-section that is smaller than the cross-section of the connecting wire engaged by said groove, so that said wire is received in said groove by a snap-in hold.
18. A process according to claim 13, wherein step (e) comprises engaging each of said metal plates with dovetail-type undercuts provided in said encapsulation body.

* * * * *